(12) United States Patent
Niedermeier et al.

(10) Patent No.: US 10,770,051 B2
(45) Date of Patent: Sep. 8, 2020

(54) APPARATUS AND METHOD FOR HARMONIC-PERCUSSIVE-RESIDUAL SOUND SEPARATION USING A STRUCTURE TENSOR ON SPECTROGRAMS

(71) Applicant: Fraunhofer-Gesellschaft zur Förderung der angewandten Forschung e.V., Munich (DE)

(72) Inventors: Andreas Niedermeier, Munich (DE); Richard Füg, Nuremberg (DE); Sascha Disch, Fürth (DE); Meinard Müller, Erlangen (DE); Jonathan Driedger, Cologne (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/129,732

(22) Filed: Sep. 12, 2018

(65) Prior Publication Data

US 2019/0012999 A1 Jan. 10, 2019

Related U.S. Application Data

(63) Continuation of application No. PCT/EP2017/056257, filed on Mar. 16, 2017.

(30) Foreign Application Priority Data

Mar. 18, 2016 (EP) .................... 16161251

(51) Int. Cl.
*G10H 1/40* (2006.01)
*G06F 16/683* (2019.01)
*G06F 17/16* (2006.01)

(52) U.S. Cl.
CPC ............. *G10H 1/40* (2013.01); *G06F 16/683* (2019.01); *G06F 17/16* (2013.01);
(Continued)

(58) Field of Classification Search
CPC ............... G10H 1/40; G10H 2250/235; G10H 2250/221; G10H 2210/031;
(Continued)

(56) References Cited

U.S. PATENT DOCUMENTS 5,845,241 A * 12/1998 Owechko ................ G10L 25/48
704/203
7,521,622 B1 * 4/2009 Zhang ..................... G10L 25/78
84/603
(Continued)

FOREIGN PATENT DOCUMENTS

CN 103680517 A 3/2014
JP 638698 A 1/1988
(Continued)

OTHER PUBLICATIONS

Russian Office Action dated Mar. 18, 2019 in Russian patent application No. 2018136575 with English translation.
(Continued)

*Primary Examiner* — Jeffrey Donels
(74) *Attorney, Agent, or Firm* — McClure, Qualey & Rodack, LLP

(57) ABSTRACT

An apparatus for analysing a magnitude spectrogram of an audio signal is provided. The apparatus includes a frequency change determiner being configured to determine a change of a frequency for each time-frequency bin of a plurality of time-frequency bins of the magnitude spectrogram of the audio signal depending on the magnitude spectrogram of the audio signal. Moreover, the apparatus includes a classifier being configured to assign each time-frequency bin of the
(Continued)

plurality of time-frequency bins to a signal component group of two or more signal component groups depending on the change of the frequency determined for the time-frequency bin.

17 Claims, 6 Drawing Sheets

(52) U.S. Cl.
CPC . *G10H 2210/031* (2013.01); *G10H 2250/025* (2013.01); *G10H 2250/031* (2013.01); *G10H 2250/131* (2013.01); *G10H 2250/215* (2013.01); *G10H 2250/221* (2013.01); *G10H 2250/235* (2013.01); *G10H 2250/261* (2013.01)

(58) Field of Classification Search
CPC ....... G10H 2250/215; G10H 2250/261; G10H 2250/131; G10H 2250/031; G10H 2250/025; G06F 16/683; G06F 17/16
See application file for complete search history.

(56) References Cited

U.S. PATENT DOCUMENTS

| | | | |
|---|---|---|---|
| 10,354,632 B2* | 7/2019 | Deif | H03F 1/26 |
| 10,410,640 B2* | 9/2019 | Ono | G10L 19/008 |
| 2006/0064299 A1 | 3/2006 | Uhle et al. | |
| 2011/0058685 A1* | 3/2011 | Sagayama | G10L 21/0272 381/98 |
| 2011/0271819 A1 | 11/2011 | Arimoto et al. | |
| 2014/0341395 A1 | 11/2014 | Matsumoto et al. | |
| 2015/0286459 A1 | 10/2015 | Braun et al. | |

FOREIGN PATENT DOCUMENTS

| | | |
|---|---|---|
| JP | 2009210888 A | 9/2009 |
| JP | 2010054802 | 3/2010 |
| JP | 2010054802 A | 3/2010 |
| JP | 2010-210758 A | 9/2010 |
| JP | 2011221156 A | 11/2011 |
| JP | 2013164584 A | 8/2013 |
| JP | 2016-506664 A | 3/2016 |
| WO | 2013038459 A1 | 3/2013 |

OTHER PUBLICATIONS

International Search Report for PCT/EP2017/056257 dated May 12, 2017.
Hideyuki Tachibana et al, "Harmonic/percussive sound separation based on anisotropic smoothness of spectrograms", IEEE/ACM Transactions on Audio, Speech, and Language Processing, IEEE, USA, vol. 22, No. 12, Dec. 1, 2014 (Dec. 1, 2014), pp. 2059-2073.
Bardeli R., "Similarity Search in Animal Sound Databases" IEEE Transactions on Multimedia, IEEE Service Center, Piscataway, NJ, US, vol. 11, No. 1, Jan. 1, 2009 (Jan. 1, 2009), pp. 68-76.
Matthias Zeppelzauer et al, "Acoustic detection of elephant presence in noisy environments" Proceedings of the 2nd ACM International Workshop on Multimedia Analysis for Ecological Data, MAED '13, Jan. 1, 2013 (Jan. 1, 2013), pp. 3-8.
Aggelos Gkiokas, Vassilios Katsouros, George Carayannis, and Themos Stafylakis, "Music tempo estimation and beat tracking by applying source separation and metrical relations", in Proceedings of the IEEE International Conference on Acoustics, Speech, and Signal Processing (ICASSP), 2012, pp. 421-424. XP032227150.
Bernhard Lehner, Gerhard Widmer, and Reinhard Sonnleitner, "On the reduction of false positives in singing voice detection", in Proceedings of the IEEE International Conference on Acoustics, Speech, and Signal Processing (ICASSP), Florence, Italy, 2014, pp. 7480-7484. XP03267296.

Yushi Ueda, Yuuki Uchiyama, Takuya Nishimoto, Nobutaka Ono, and Shigeki Sagayama, "HMM-based approach for automatic chord detection using refined acoustic features", in Proceedings of the IEEE International Conference on Acoustics, Speech, and Signal Processing (ICASSP), Dallas, Texas, USA, 2010, pp. 5518-5521. XP031697185.
Nobutaka Ono, Kenichi Miyamoto, Hirokazu Kameoka, and Shigeki Sagayama, "A real-time equalizer of harmonic and percussive components in music signals", in Proceedings of the International Society for Music Information Retrieval Conference (ISMIR), Philadelphia, Pennsylvania, USA, 2008, pp. 139-144.
Nobutaka Ono, Kenichi Miyamoto, Jonathan LeRoux, Hirokazu Kameoka, and Shigeki Sagayama, "Separation of a monaural audio signal into harmonic/percussive components by complementary diffusion on spectrogram", in European Signal Processing Conference, Lausanne, Switzerland, 2008, pp. 240-244.
Nobutaka Ono, Kenichi Miyamoto, Hirokazu Kameoka, Jonathan Le roux, Yuuki Uchiyama, Emiru Tsunoo, Takuya Nishimoto, Shigeki Sagayama_"Harmonic and percussive sound separation and ist application to MIR-related tasks"_Advances in Music Inforamtion Retrieval_vol. 274 of Studies in Computational Intelligence_ pp. 213-236_Springer Berlin Heidelberg_2010.
Derry Fitzgerald, "Harmonic/percussive separation using median filtering", in Proceedings of the International Conference on Digital Audio Effects (DAFX), Graz, Austria, 2010, pp. 246-253.
Scott N. Levine and Julius O. Smith III, "A sines+transients+noise audio representation for data compression and time/pitch scale modications", in Proceedings of the AES Convention, 1998.
Tony S. Verma and Teresa H.Y. Meng, "An analysis/synthesis tool for transient signals that allows a flexible sines +transients+noise model for audio", in Proceedings of the IEEE International Conference on Acoustics, Speech, and Signal Processing (ICASSP), Seattle, Washington, USA, May 1998, pp. 3573-3576.
Laurent Daudet, "Sparse and structured decompositions of signals with the molecular matching pursuit", IEEE Transactions on Audio, Speech, and Language Processing, vol. 14, No. 5, pp. 1808-1816, Sep. 2006. XP002627741.
Jonathan Driedger, Meinard Müller, and Sascha Disch, "Extending harmonic-percussive separation of audio signals", in Proceedings of the International Conference on Music Information Retrieval (ISMIR), Taipei, Taiwan, 2014, pp. 611-616.
Jeongsoo Park and Kyogu Lee, "Harmonic-percussive source separation using harmonicity and sparsity constraints", in Proceedings of the International Conference on Music Information Retrieval (ISMIR), Málaga, Spain, 2015, pp. 148-154.
Josef Bigun and Gösta H. Granlund, "Optimal orientation detection of linear symmetry", in Proceedings of the IEEE First International Conference on Computer Vision, London, UK, 1987, pp. 433-438.
Hans Knutsson, "Representing local structure using tensors", in 6th Scandinavian Conference on Image Analysis, Oulu, Finland, 1989, pp. 244-251.
Chris Harris and Mike Stephens, "A combined corner and edge detector", in Proceedings of the 4th Alvey Vision Conference, Manchester, UK, 1988, pp. 147-151.
Rolf Bardeli, "Similarity search in animal sound databases", IEEE Transactions on Multimedia, vol. 11, No. 1, pp. 68-76, Jan. 2009. XP011346581.
Matthias Zeppelzauer, Angela S. Stöger, and Christian Breiteneder, "Acoustic detection of elephant presence in noisy environments", in Proceedings of the 2nd ACM International Workshop on Multimedia Analysis for Ecological Data, Barcelona, Spain, 2013, pp. 4. 3-8. XP055298139.
Hanno Scharr, "Optimale Operatoren in der digitalen Bildverarbeitung", Dissertation, IWR, Fakultät für Physik und Astronomie, Universität Heidelberg, Heidelberg, Germany, 2000. (including English abstract).
Emmanuel Vincent, Rémi Gribonval, and Cédric Févotte, "Performance measurement in blind audio source separation", IEEE Transactions on Audio, Speech, and Language Processing, vol. 14, No. 4, pp. 1462-1469, 2006.
Hideyuki Tachibana et al, ""Harmonic/percussive sound separation based on anisotropic smoothness of spectrograms"", IEEE/ACM Transactions on Audio, Speech, and Language Processing, IEEE,

(56) References Cited

OTHER PUBLICATIONS

USA, (Dec. 1, 2014), vol. 22, No. 12, doi:10.1109/TASLP.2014.2351131, ISSN 2329-9290, pp. 2059-2073, XP058065966.
https://www.audiolabs-erlangen.de/resources/MIR/2016-ICASSP-HPRST/ (printed Nov. 29, 2018).
Japanese Office Action dated Jan. 28, 2020, issued in application No. 2018-549258.
English language translation of Japanese Office Action dated Jan. 28, 2020, issued in application No. 2018-549258.

* cited by examiner

APPARATUS AND METHOD FOR HARMONIC-PERCUSSIVE-RESIDUAL SOUND SEPARATION USING A STRUCTURE TENSOR ON SPECTROGRAMS

CROSS-REFERENCES TO RELATED APPLICATIONS

This application is a continuation of copending International Application No. PCT/EP2017/056257, filed Mar. 16, 2017, which is incorporated herein by reference in its entirety, and additionally claims priority from European Application No. EP 16 161 251.0, filed Mar. 18, 2016, which is incorporated herein by reference in its entirety.

BACKGROUND OF THE INVENTION

The present invention relates to audio signal processing, and, in particular, to an apparatus and method for harmonic-percussive-residual sound separation using the structure tensor on spectrograms.

Being able to separate a sound into its harmonic and percussive component is an effective preprocessing step for many applications.

While "Harmonic-Percussive(-Residual) Separation" is a common term, it is misleading as it implies a harmonic structure with sinusoidals having a frequency of an integer multiple of the fundamental frequency. Even though the correct term should be "Tonal-Percussive-(Residual) Separation", the term and "harmonic" instead of "tonal" is used in the following for easier understanding.

Using the separated percussive component of a music recording for example can lead to a quality improvement for beat tracking (see [1]), rhythm analysis and transcription of rhythm instruments. The separated harmonic component is suitable for the transcription of pitched instruments and chord detection (see [3]). Furthermore, harmonic-percussive separation can be used for remixing purposes like changing the level ratio between both signal components (see [4]), which leads to an either "smoother" or "punchier" overall sound perception.

Some methods for harmonic-percussive sound separation rely on the assumption that harmonic sounds have a horizontal structure in the magnitude spectrogram of the input signal (in time direction), while percussive sounds appear as vertical structures (in frequency direction). Ono et al presented a method that first creates harmonically/percussively enhanced spectrograms by diffusion in time/frequency direction (see [5]). By comparing these enhanced representations afterwards, a decision if a sound is either harmonic or percussive could be derived.

A similar method was published by Fitzgerald, where the enhanced spectrograms were calculated by using median filtering in perpendicular directions instead of diffusion (see [6]), which led to similar results while reducing the computational complexity.

Inspired by the sines+transients+noise (S+T+N) signal model (see [7], [8], [9]), a framework that aims to describe the respective signal components by means of a small set of parameters. Fitzgerald's method was then extended to harmonic-percussive-residual (HPR) separation in [10]. As audio signals often consist of sounds that are neither clearly harmonic nor percussive, this procedure captures these sounds in a third, residual component. While some of these residual signals clearly have an isotropic, neither horizontal nor vertical, structure (as for example noise), there exist sounds that do not have a clear horizontal structure but nevertheless carry tonal information and may be perceived as harmonic part of a sound. An example are frequency modulated tones like they can occur in recordings of violin playing or vocals, where they are said to have "vibrato". Due to the strategy of recognizing either horizontal or vertical structures, the aforementioned methods are not always able to capture such sounds in their harmonic component.

A harmonic-percussive separation procedure based on non-negative matrix factorization that is capable of capturing harmonic sounds with non-horizontal spectral structures in the harmonic component was proposed in [11]. However it did not include a third residual component.

Summarizing the above, recent methods rely on the observation that in a spectrogram representation, harmonic sounds lead to horizontal structures and percussive sounds lead to vertical structures. Furthermore, these methods associate structures that are neither horizontal nor vertical (i.e., non-harmonic, non-percussive sounds) with a residual category. However, this assumption does not hold for signals like frequency modulated tones that show fluctuating spectral structures, while nevertheless carrying tonal information.

The structure tensor, a tool used in image processing (see [12], [13]), is applied there to grey scale images for edge and corner detection (see [14]) or to estimate the orientation of an object. The structure tensor has already been used for preprocessing and feature extraction in audio processing (see [15], [16]).

SUMMARY

According to an embodiment, an apparatus for analysing a magnitude spectrogram of an audio signal may have: a frequency change determiner being configured to determine a change of a frequency for each time-frequency bin of a plurality of time-frequency bins of the magnitude spectrogram of the audio signal depending on the magnitude spectrogram of the audio signal, and a classifier being configured to assign each time-frequency bin of the plurality of time-frequency bins to a signal component group of two or more signal component groups depending on the change of the frequency determined for said time-frequency bin.

According to another embodiment, a method for analysing a magnitude spectrogram of an audio signal may have the steps of: determining a change of a frequency for each time-frequency bin of a plurality of time-frequency bins of the magnitude spectrogram of the audio signal depending on the magnitude spectrogram of the audio signal, and assigning each time-frequency bin of the plurality of time-frequency bins to a signal component group of two or more signal component groups depending on the change of the frequency determined for said time-frequency bin.

Another embodiment may have a non-transitory digital storage medium having a computer program stored thereon to perform the method for analysing a magnitude spectrogram of an audio signal, the method having the steps of: determining a change of a frequency for each time-frequency bin of a plurality of time-frequency bins of the magnitude spectrogram of the audio signal depending on the magnitude spectrogram of the audio signal, and assigning each time-frequency bin of the plurality of time-frequency bins to a signal component group of two or more signal component groups depending on the change of the frequency determined for said time-frequency bin, when said computer program is run by a computer.

An apparatus for analysing a magnitude spectrogram of an audio signal is provided. The apparatus comprises a frequency change determiner being configured to determine a change of a frequency for each time-frequency bin of a plurality of time-frequency bins of the magnitude spectrogram of the audio signal depending on the magnitude spectrogram of the audio signal. Moreover, the apparatus comprises a classifier being configured to assign each time-frequency bin of the plurality of time-frequency bins to a signal component group of two or more signal component groups depending on the change of the frequency determined for said time-frequency bin.

Moreover, a method for analysing a magnitude spectrogram of an audio signal is provided. The method comprises:

Determining a change of a frequency for each time-frequency bin of a plurality of time-frequency bins of the magnitude spectrogram of the audio signal depending on the magnitude spectrogram of the audio signal. And:

Assigning each time-frequency bin of the plurality of time-frequency bins to a signal component group of two or more signal component groups depending on the change of the frequency determined for said time-frequency bin.

Furthermore, a computer program is provided, wherein the computer program is configured to implement the above-described method when being executed on a computer or signal processor.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
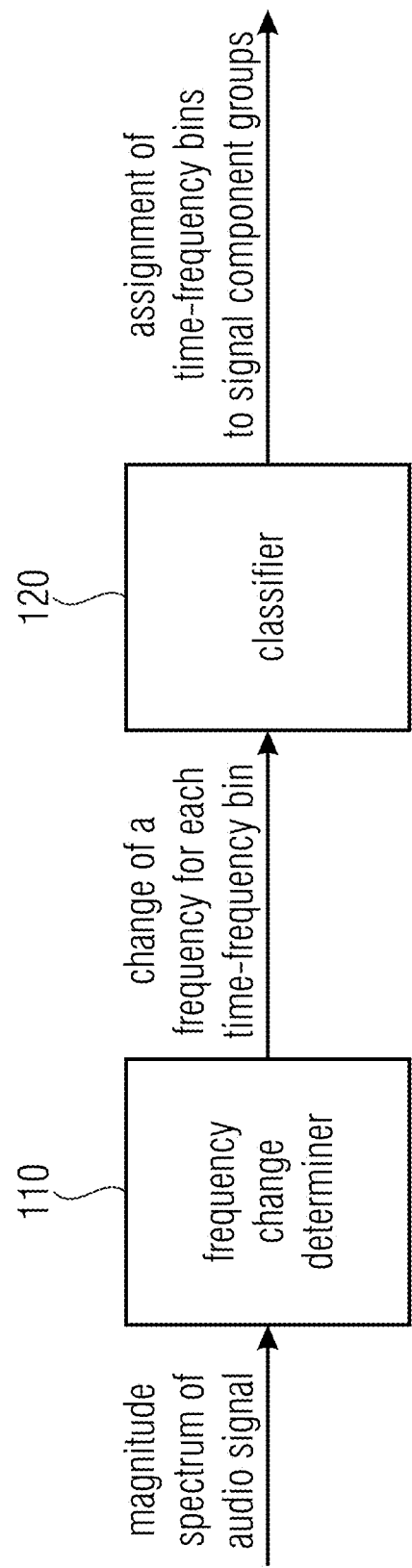
FIG. 1 illustrates an apparatus for analysing a magnitude spectrogram of an audio signal according to an embodiment.

FIG. 1 illustrates an apparatus for analysing a magnitude spectrogram of an audio signal according to embodiments.

The apparatus comprises a frequency change determiner 110. The frequency change determiner 110 is configured to determine a change of a frequency for each time-frequency bin of a plurality of time-frequency bins of the magnitude spectrogram of the audio signal depending on the magnitude spectrogram of the audio signal.

Moreover, the apparatus comprises a classifier 120. The classifier 120 is configured to assign each time-frequency bin of the plurality of time-frequency bins to a signal component group of two or more signal component groups depending on the change of the frequency determined for said time-frequency bin.

According to an embodiment, the frequency change determiner 110 may, e.g., be configured to determine the change of the frequency for each time-frequency bin of the plurality of time-frequency bins depending on an angle α(b, k) for said time-frequency bin. The angle α(b, k) for said time-frequency bin depends on the magnitude spectrogram of the audio signal.

In an embodiment, the frequency change determiner 110 may, e.g., be configured to determine the change of the frequency for each time-frequency bin of the plurality of time-frequency bins further depending on a sampling frequency $f_s$ of the audio signal, and depending on a length N of an analysis window and depending on a hop size H of the analysis window.

According to an embodiment, the apparatus frequency change determiner 110 is configured to determine the change of the frequency for each time-frequency bin of the plurality of time-frequency bins depending on the formula $$R(b, k) = \frac{f_s^2}{HN} \cdot \tan(\alpha(b, k))$$

(b, k) indicates a time-frequency bin of the plurality of time-frequency bins, wherein R(b, k) indicates the change of the frequency for said time-frequency bin (b, k), wherein b indicates time, wherein k indicates frequency, wherein $f_s$ indicates the sampling frequency of the audio signal, wherein N indicates the length of the analysis window, wherein H indicates the hop size of the analysis window, and wherein α(b, k) indicates the angle for said time-frequency bin (b, k), wherein the angle α(b, k) depends on the magnitude spectrogram.

In an embodiment, the frequency change determiner 110 may, e.g., be configured to determine a partial derivative $S_b$ of the magnitude spectrogram S of the audio signal with respect to a time index. In such an embodiment, the frequency change determiner 110 may, e.g., be configured to determine a partial derivative $S_k$ of the magnitude spectrogram S of the audio signal with respect to a time index.

Moreover, in such an embodiment, the frequency change determiner 110 is configured to determine a structure tensor T(b, k) for each time-frequency bin (b, k) of the plurality of time-frequency bins depending on the partial derivative $S_b$ of the magnitude spectrogram S of the audio signal with respect to the time index and depending on the partial derivative $S_k$ of the magnitude spectrogram S of the audio signal with respect to the frequency index.

Furthermore, in such an embodiment, the frequency change determiner 110 may, e.g., be configured to determine the angle α(b, k) for each time-frequency bin (b, k) of the plurality of time-frequency bins depending the structure tensor T(b, k) for said time-frequency bin (b, k).

According to an embodiment, the frequency change determiner 110 may, e.g., be configured to determine the angle α(b, k) for each time-frequency bin (b, k) of the plurality of time-frequency bins by determining two components of $v_1(b, k)$ and $v_2(b, k)$ an eigenvector v(b, k) of the structure tensor (T(b, k)) of said time-frequency bin (b, k), and by determining the angle (α(b, k)) for said time-frequency bin ((b, k)) according to $$\alpha(b, k) = \operatorname{atan}\left(\frac{v_2(b, k)}{v_1(b, k)}\right) \in [-\pi/2; \pi/2]$$

α(b, k) indicates the angle for said time-frequency bin ((b, k)), wherein b indicates time, wherein k indicates frequency, and wherein a tan( ) indicates an inverse tangent function.

In an embodiment, the classifier 120 may, e.g., be configured to determine a measure of anisotropy for each time-frequency bin (b, k) of the plurality of time-frequency bins depending on at least one of the formulae:

$$\left(\frac{\mu(b, k) - \lambda(b, k)}{\mu(b, k) + \lambda(b, k)}\right)^2$$

and $$\mu(b, k) + \lambda(b, k) \geq e,$$

μ(b, k) is a first eigenvalue λ (b, k) is a second eigenvalue of the structure tensor (T(b, k)) of said time-frequency bin (b, k), and $e \in \mathbb{R} > 0$.

In such an embodiment, the classifier 120 may, e.g., be configured to assign each time-frequency bin of the plurality of time-frequency bins to a signal component group of two or more signal component groups further depending on the change of the measure of anisotropy.

According to an embodiment, the classifier 120 may, e.g., be configured to determine the measure of anisotropy for said time-frequency bin (b, k) depending on the formula:

$$C(b, k) = \begin{cases} \left(\frac{\mu(b, k) - \lambda(b, k)}{\mu(b, k) + \lambda(b, k)}\right)^2, & \mu(b, k) + \lambda(b, k) \geq e \\ 0, & \text{else} \end{cases}$$

C(b, k) is the measure of anisotropy depending for said time-frequency bin (b, k), and wherein the classifier 120 is configured to assign said time-frequency bin (b, k) to a residual component group of the two or more signal component groups, if the measure of anisotropy C(b, k) is smaller than a first threshold value c, or wherein the classifier 120 is configured to assign said time-frequency bin (b, k) to the residual component group of the two or more signal component groups, if the measure of anisotropy C(b, k) is smaller than or equal to the first threshold value c, wherein $c \in \mathbb{R} > 0$.

In an embodiment, the classifier 120 may, e.g., be configured to assign each time-frequency bin of the plurality of time-frequency bins to a signal component group of two or more signal component groups depending on the change R(b, k) of the frequency determined for said time-frequency bin (b, k), so that the classifier 120 assigns a time-frequency bin of the plurality of time-frequency bins to a harmonic signal component group of the two or more signal component groups depending on whether an absolute value |R(b, k)| of the change R(b, k) of the frequency determined for said time-frequency bin (b, k) is smaller than a second threshold value $r_h$, or depending on whether the absolute value |R(b, k)| of the change R(b, k) of the frequency determined for said time-frequency bin (b, k) is smaller than or equal to the second threshold value $r_h$, wherein $r_h \in \mathbb{R} > 0$.

According to an embodiment, the classifier 120 may, e.g., be configured to assign each time-frequency bin of the plurality of time-frequency bins to a signal component group of two or more signal component groups depending on the change R(b, k) of the frequency determined for said time-frequency bin (b, k), so that the classifier 120 assigns a time-frequency bin of the plurality of time-frequency bins to a percussive signal component group of the two or more signal component groups depending on whether the absolute value |R(b, k)| of the change R(b, k) of the frequency determined for said time-frequency bin (b, k) is greater than a third threshold value $r_p$, or depending on whether the absolute value |R(b, k)| of the change (R(b, k)) of the frequency determined for said time-frequency bin (b, k) is greater than or equal to the third threshold value $r_p$, wherein $r_p \in \mathbb{R} > 0$.

In the following, a detailed description of embodiments is provided.

Embodiments provide improved concepts for Harmonic-percussive-residual (HPR) sound separation based on the structure tensor. Some embodiments capture frequency modulated sounds that hold tonal information in the harmonic component by exploiting the information about the orientation of spectral structures provided by the structure tensor.

Some embodiments are based on the finding that a strict classification into horizontal and vertical is inappropriate for these signals and might lead to leakage of tonal information into the residual component. Embodiments relate to a novel method that instead uses the structure tensor, a mathematical tool, to calculate predominant orientation angles in the magnitude spectrogram. Embodiments employ this orientation information to distinguish between harmonic, percussive, and residual signal components, even in the case of frequency modulated signals. Finally, the effectiveness of the concept of embodiments is verified by means of both objective evaluation measures as well as audio examples.

Moreover, some embodiments are based on the finding that the structure tensor can be considered a black box, where the input is a gray scale image and the outputs are angles n for each pixel corresponding to the direction of lowest change and a certainty or anisotropy measure for this direction for each pixel. The structure tensor additionally offers the possibility to be smoothed, which reduces the influence of noise for enhanced robustness. Furthermore the certainty measure can be used to determine the quality of the estimated angles. A low value of this certainty measure indicates that the pixel lays in a region of constant brightness without any clear direction.

A local frequency change may, e.g., be extracted from the angles obtained by the structure tensor. Form these angles, it can be determined, whether a time-frequency-bin in the spectrogram belongs to the harmonic (=low local frequency change) or the percussive (=high or infinite local frequency change) component.

Improved embodiments for Harmonic-Percussive-Residual Classification And Separation are provided.

Harmonic-percussive-residual sound separation is a useful preprocessing tool for applications such as pitched instrument transcription or rhythm extraction. Instead of searching only for strictly horizontal and vertical structures, some embodiments determine predominant orientation angles as well as the local anisotropy in the spectrogram by using the structure tensor known from image processing.

Figure 2:
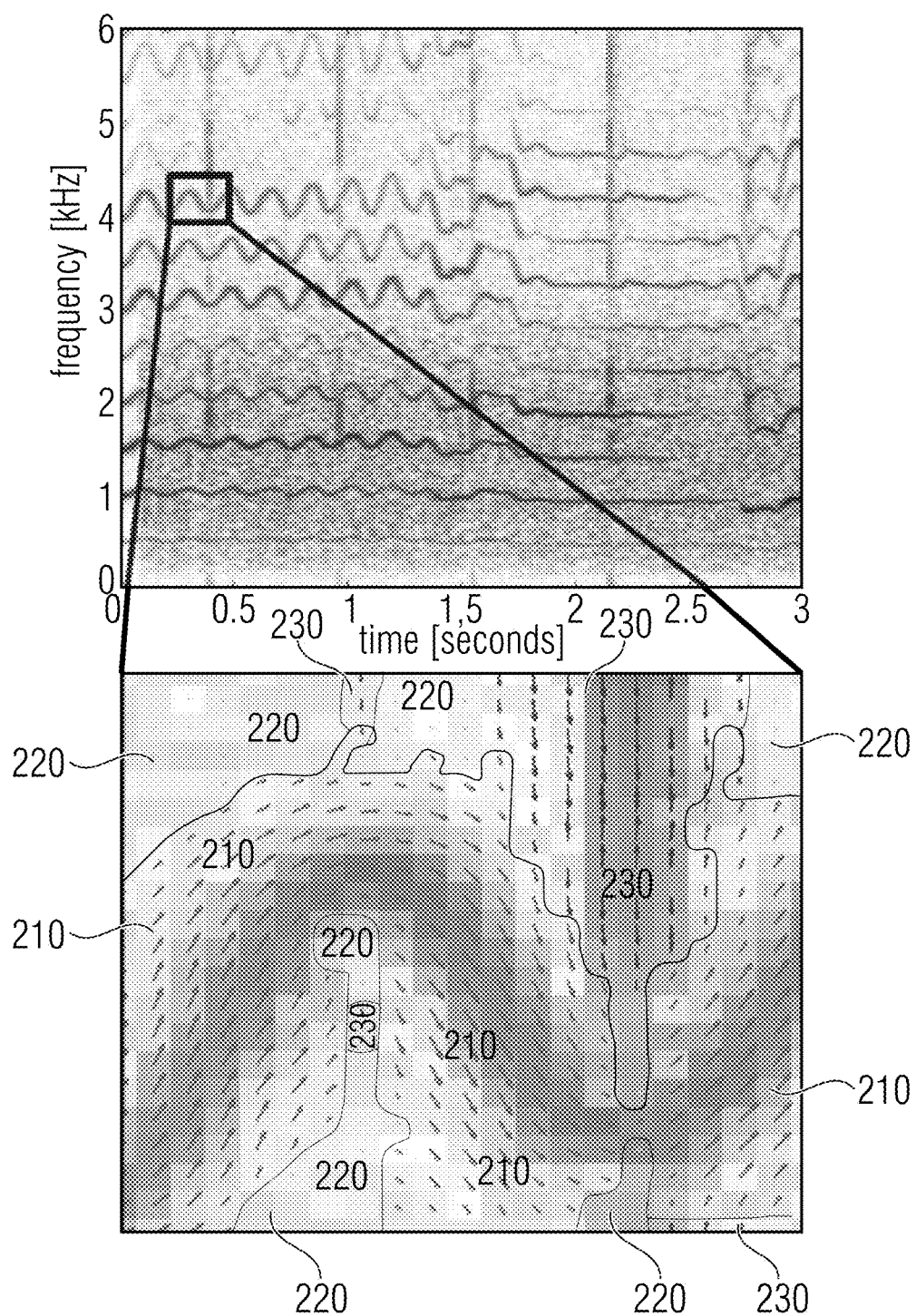
FIG. 2 illustrates a spectrogram of a mixture of a singing voice, castanets, and applause with zoomed in region according to an embodiment, wherein the orientation of the arrows indicates direction and wherein the length of the arrows indicates an anisotropy measure.

In embodiments, the provided information about the orientation of spectral structures can then be used to distinguish between harmonic, percussive, and residual signal components by setting appropriate thresholds, see FIG. 2.

FIG. 2 illustrates a spectrogram of a mixture of a singing voice, castanets, and applause with zoomed in region additionally showing direction (orientation of arrows) and anisotropy measure (length of arrows) obtained by the structure tensor. The color of the arrows indicate whether the respective time-frequency bin is assigned to the harmonic component (areas 210), to the percussive component (areas 230), or to the residual component (areas 220) based on the orientation and anisotropy information.

All bins having neither a high nor a low local frequency change rate or a certainty measure that indicates a constant region were assigned to belong to the residual component. An example for this separation of a spectrogram can be seen in FIG. 2. Embodiments perform better for audio signals containing frequency modulated sounds than similar methods working on the magnitude spectrogram.

At first, a concept of structure tensor is described and this general concept is extended to be applicable in the context of audio processing.

In the following, matrices and vectors are written as bold letters for notational convenience. Furthermore, the (•) operator is used to index a specific element. In this case the matrix or vector is written as a non-bold letter to show its scalar use.

At first, calculation of a spectrogram according to embodiments is described. The audio signal may, e.g., be a (discrete) input audio signal.

The structure tensor may be applied to the spectrogram representation of a discrete input audio signal $x \in \mathbb{R}^M$ with a sampling frequency of $f_s$. For the spectral analysis of x, the short-time Fourier-transform (STFT)

$$X(b,k) := \sum_{n=0}^{N-1} w(n)x(n+Hb)\exp(-i2\pi nk/N) \quad (1)$$

is used, where $X(b,k) \in \mathbb{C}$, b denotes the frame index, k the frequency index and $w \in \mathbb{R}^N$ is a window function of length N (in other words: N is a length of an analysis window). $H \in \mathbb{N}$, $H \leq N$ represents the analysis hop size of the window. It should be noted that since the STFT spectrum has a certain symmetry around the Nyquist point at $$\frac{N}{2},$$

the processing may, for example, be restricted to $0 \leq k \leq$ $$\frac{N}{2},$$

as the symmetry can be reconstructed during the inverse STFT.

By using the above formula (1), a spectrogram can be obtained. A spectrogram comprises a plurality of spectra, wherein the plurality of spectra succeed each other in time. A second spectrum of the plurality spectra succeeds a first spectrum in time, if at least some second time domain samples exist that are used to generate the second spectrum and that are not used to generate the first spectrum, and that are time domain samples that refer to a later point-in-time than first time domain samples that are used to generate the first spectrum. Windows of time domain samples used for generating timely neighbored spectra may, for example, overlap.

In embodiments, the analysis window length N may, e.g., be defined to be:

$$256 \text{ samples} \leq N \leq 2048 \text{ samples},$$

In some embodiments, the analysis window length may, e.g., be 2048. In other embodiments, the analysis window length may, e.g., be 1024 samples. In further embodiments, the analysis window length may, e.g., be 768 samples. In still further embodiments, the analysis window length may, e.g., be 256 samples.

In embodiments, the analysis hop size H may, e.g., be in a range between 25% and 75% of the analysis window. In such embodiments:

$$0.25 \, N \leq H \leq 0.75 \, N.$$

Thus, in such embodiments, if the analysis window has, e.g., 2048 samples (N=2048), the analysis hop size may, e.g., be in the range:

$$512 \text{ samples} \leq H \leq 1536 \text{ samples}.$$

If the analysis window has, e.g., 256 samples (N=256), the analysis hop size may, e.g., be in the range:

$$64 \text{ samples} \leq H \leq 192 \text{ samples}.$$

In embodiments, the analysis hop size may, e.g., be 50% of the analysis window. This corresponds to a window overlap of two subsequent analysis windows of 50%.

In some embodiments, the analysis hop size may, e.g., be 25% of the analysis window. This corresponds to a window overlap of two subsequent analysis windows of 75%.

In other embodiments, the analysis hop size may, e.g., be 75% of the analysis window. This corresponds to a window overlap of two subsequent analysis windows of 25%.

It should be noted that the concepts of the present invention are applicable for any kind of time domain to spectral domain transformation, such as for the MDCT (Modified Discrete Cosine Transform), MDST (Modified Discrete Sine Transform, DSTFT (Discrete Short-Time Fourier Transform), etc.

The real valued logarithmic spectrogram may, e.g., be calculated as:

$$S(b,k)=20 \log_{10}|X(b,k)| \quad (2)$$

The magnitude spectrogram of the audio signal may be referred to as S and a value of the magnitude spectrogram for a time-frequency bin (b, k) may be referred to as S(b, k).

In the following, calculation of the structure tensor according to embodiments is described.

For the calculation of the structure tensor the partial derivatives of S are needed. The partial derivative with respect to time index h is given by $$S_b = S * d \quad (3)$$

while the partial derivative with respect to frequency index k is defined as $$S_k = S * d^T \quad (4)$$

where d is a discrete differentiation operator (for example, for central differences one could choose d=[−1, 0, 1]/2) and * denotes the 2-dimensional convolution.

Furthermore, it may be defined:

$$T_{11}=(S_b \odot S_b)*G \quad (5)$$

$$T_{21}=T_{12}=(S_k \odot S_b)*G \quad (6)$$

$$T_{22}=(S_k \odot S_k)*G \quad (7)$$

where $\odot$ is the point wise matrix multiplication, also known as the Hadamard product and G is a 2-D Gaussian smoothing filter having the standard deviation $\sigma_b$ in time index direction and $\sigma_k$ in frequency index direction. The structure tensor $T(b, k)$ is then given by a 2×2 symmetric and positive semidefinite matrix $$T(b,k) = \begin{bmatrix} T_{11}(b,k) & T_{12}(b,k) \\ T_{21}(b,k) & T_{22}(b,k) \end{bmatrix} \quad (8)$$

The structure tensor contains information about the dominant orientation of the spectrogram at position (b, k). It should be noted that in the special case where G is a scalar, $T(b, k)$ does not contain more information than the gradient at this position in the spectrogram. However in contrast to the gradient, the structure tensor can be smoothed by G without cancellation effects, which makes it more robust against noise.

It should be noted, that a structure tensor $T(b, k)$ is defined for each time-frequency bin (b, k) of the plurality of time-frequency bins. So when a plurality of time frequency bins is considered, e.g., the time-frequency bins (0, 0); (0, 1); (0, 2); . . . (1, 0); (1, 1); (1, 2); . . . then there exist a plurality of structure tensors $T(0, 0)$ $T(0, 1)$ $T(0, 2)$; . . . (1, 0); $T(1, 1)$; $T(1, 2)$; . . . . For example, for each time-frequency bin (b, k) of the plurality of time-frequency bins, one structure tensor $T(b, k)$ is determined.

In the following, calculation of angles and an anisotropy measure according to embodiments is described.

The information about the orientation for each bin in the spectrogram is obtained by calculating the eigenvalues $\lambda(b, k)$, $\mu(b, k)$ with $\lambda(b, k) \leq \mu(b, k)$ and the corresponding eigenvectors $v(b,k)=[v_1(b, k), v_2(b, k)]^T$ and $w(b,k)=[w_1(b, k), w_2(b, k)]^T$ of the structure tensor $T(b, k)$. It should be noted that $v(b, k)$, the eigenvector corresponding to the smaller eigenvalue $\lambda(b, k)$, is pointing into the direction of lowest change in the spectrogram at index (b, k), while $w(b, k)$ is pointing in to the direction of highest change. Thus, the angle of the orientation at a specific bin can be obtained by $$\alpha(b,k) = \text{atan}\left(\frac{v_2(b,k)}{v_1(b,k)}\right) \in [-\pi/2; \pi/2] \quad (9)$$

$v_1(b, k)$ and $v_2(b, k)$ are the components of the eigenvector $v(b, k)$. atan( ) indicates an inverse tangent function.

In addition, a measure of anisotropy $$C(b,k) = \begin{cases} \left(\frac{\mu(b,k)-\lambda(b,k)}{\mu(b,k)+\lambda(b,k)}\right)^2, & \mu(b,k)+\lambda(b,k) \geq e \\ 0, & \text{else} \end{cases} \quad (10)$$

with $e \in \mathbb{R} > 0$ can be determined for each bin. It should be noted that $C(b, k) \in [0; 1]$. Values of $C(b, k)$ close to 1 indicate a high anisotropy of the spectrogram at index (b, k), while a constant neighborhood leads to values close to 0. The threshold e, that defines a limit on what should be considered anisotropic, can be chosen to further increase the robustness against noise.

The physical meaning of angle $\alpha(b, k)$ can be understood by considering a continuous signal with a change of instantaneous frequency $\Delta_f$ during a time interval $\Delta t$. Thus the instantaneous frequency change rate R is denoted by $$R = \frac{\Delta f}{\Delta t} \quad (11)$$

For example, according to embodiments, the angles (indicated by the direction of the arrows in FIG. 2) obtained by the structure tensor may, e.g., be translated into a local frequency change rate $$R = \frac{\Delta f}{\Delta t} [\text{Hz/s}] \quad (11a)$$

for each time-frequency-bin of the spectrogram.

The change of the frequency for each time-frequency bin may, e.g., be referred to as instantaneous frequency change rate.

Considering sample rate, length and hop-size of the applied STFT analysis, a relation between the angles in the spectrogram and the instantaneous frequency change rate $R(b, k)$ for each bin can be derived by $$R(b,k) = \frac{f_s^2}{HN} \cdot \tan(\alpha(b,k)) \quad (12)$$

Also the standard deviations of the smoothing filter G in the discrete domain $\sigma_b$ and $\sigma_k$ can be converted to the continuous physical parameters $\sigma_t$ and $\sigma_f$ by $$\sigma_t = \frac{H}{f_s}\sigma_b, \quad \sigma_f = \frac{f_s}{N}\sigma_k \quad (13)$$

In the following harmonic-percussive-residual separation using the structural tensor is described.

The information obtained via the structure tensor can be applied to the problem of HPR separation, e.g., to classify each bin in the spectrogram as being part of either the harmonic, the percussive or the residual component of the input signal.

Embodiments are based on the finding that bins assigned to the harmonic components should belong to rather horizontal structures, while bins belonging to rather vertical structures should be assigned to the percussive component. Furthermore, bins that do not belong to any kind of oriented structure should be assigned to the residual component.

According to embodiments, a bin (b, k) may, e.g., be assigned to the harmonic component, if it satisfies the first of the following two constraints.

According to embodiments, a bin (b, k) may, e.g., be assigned to the harmonic component, if it satisfies both of the following two constraints:

The first constraint may, e.g., be that the absolute value of the angle $\alpha(b, k)$ is smaller than (or equal to) a threshold $\alpha_h$. The threshold $\alpha_h$ may, e.g., be in the range $\alpha_h \in [0; \pi/2]$. This means, that the bin should be part of some spectral structure that does not have a slope bigger or smaller than $\alpha_h$. This way also frequency modulated sounds can be considered to be part of the harmonic component, depending on the parameter $\alpha_h$.

The second constraint may, e.g., be that the measure of anisotropy $C(b, k)$ supports that the bin (b, k) is part of some directed, anisotropic structure, and therefore exceeds a second threshold c. It should be noted that for a given bin (b, k), the angle α(b, k) and the measure of anisotropy C(b, k) together define a point in ℝ given in polar coordinates.

Figure 3:
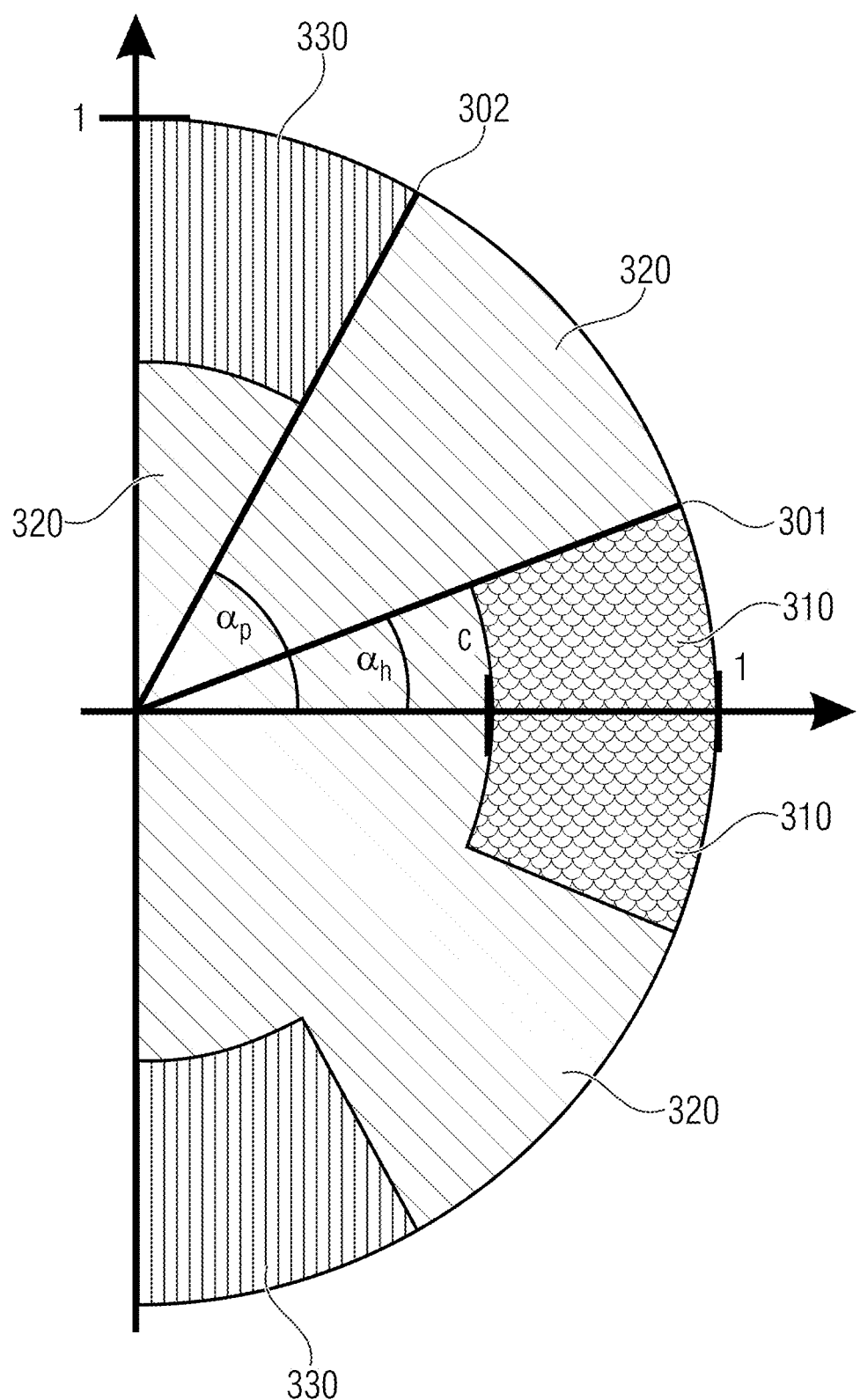
FIG. 3 illustrates a range of orientation/anisotropy values computed by using the structure tensor according to an embodiment.

Similarly, in embodiments, another angle threshold $α_p$ is assigned to define when a bin should be assigned to the percussive component (areas 330 with vertical lines in FIG. 3).

Thus, according to embodiments, a bin (b, k) may, e.g., be assigned to the percussive component, if it satisfies the first of the following two constraints.

According to embodiments, a bin (b, k) may, e.g., be assigned to the percussive component, if it satisfies both of the following two constraints:

The first constraint may, e.g., be that the absolute value of the angle α(b, k) is greater than (or equal to) a threshold $α_p$. The threshold $α_p$ may, e.g., be in the range $α_p \in [0; π/2]$. This means, that the bin should be part of some spectral structure that does not have a slope bigger or smaller than $α_p$. This way also frequency modulated sounds can be considered to be part of the harmonic component, depending on the parameter $α_p$.

The second constraint may, e.g., be that the measure of anisotropy C(b, k) supports that the bin (b, k) is part of some directed, anisotropic structure, and therefore exceeds a second threshold c. It should be noted that for a given bin (b, k), the angle α(b, k) and the measure of anisotropy C(b, k) together define a point in $\mathbb{R}^2$ given in polar coordinates.

Finally, in embodiments, all bins that are assigned to neither the harmonic nor the percussive component may, e.g., be assigned to the residual component.

The above-described assignment process can be expressed by defining a mask for the harmonic component $M_h$, a mask for the percussive component $M_p$ and a mask for the residual component $M_r$.

It should be noted, that instead of using the threshold $α_h$ and the threshold $α_p$ thresholds may in embodiments, e.g., be defined on the maximum absolute frequency change rate $r_h, r_p \in \mathbb{R} > 0$ with $r_p \geq r_h$ to give the choice of parameters a better physical interpretation. The masks are then given by:

$$M_h(b, k) = \begin{cases} 1, & |R(b, k)| \leq r_h \wedge C(b, k) > c \\ 0, & \text{else} \end{cases} \quad (14)$$

$$M_p(b, k) = \begin{cases} 1, & |R(b, k)| > r_p \wedge C(b, k) > c \\ 0, & \text{else} \end{cases} \quad (15)$$

$$M_r(b, k) = 1 - M_h(b, k) - M_p(b, k) \quad (16)$$

Finally, the SIFT of the harmonic component $X_h$, the percussive component $X_p$ and the residual component $X_r$ are obtained by $$X_h = M_h \odot X \quad (17)$$

$$X_p = M_p \odot X \quad (18)$$

$$X_r = M_r \odot X \quad (19)$$

The corresponding time signals can then be calculated via the inverse SIFT.

FIG. 3 illustrates a range of orientation/anisotropy values computed by the structure tensor.

In particular, FIG. 3 depicts the subset of all points that lead to an assignment to the harmonic component. In particular, values in the areas 310 with wavy lines lead to an assignment to the harmonic component.

Values in the areas 330 with vertical lines lead to an assignment to the percussive component.

Values in the areas 320 that are dotted lead to an assignment to the residual component.

The threshold $α_h$ defines line 301 in FIG. 3, and the threshold $α_p$ defines line 302 in FIG. 3.

Figure 5:
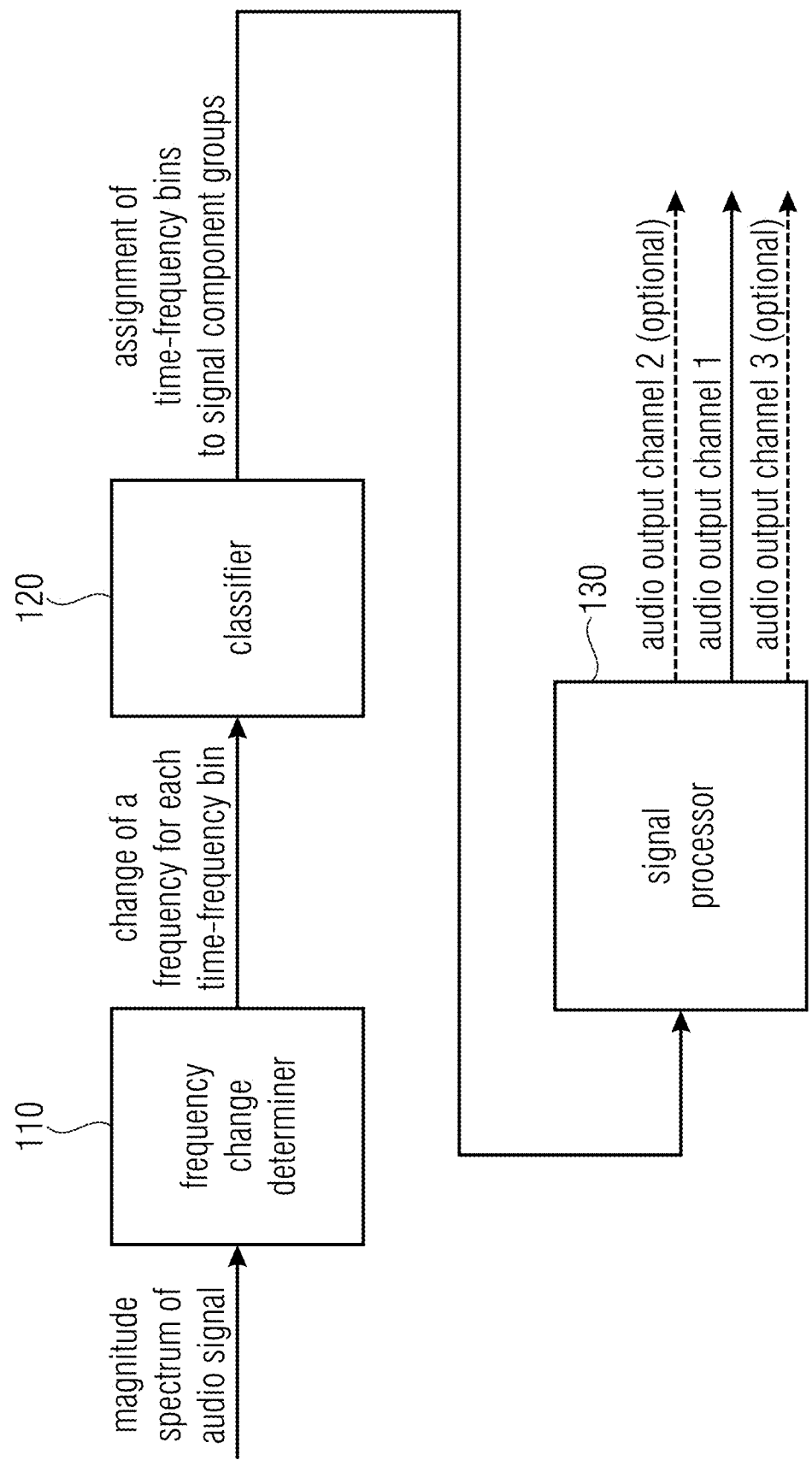
FIG. 5 illustrates an apparatus according to an embodiment, wherein the apparatus comprises a signal generator.

FIG. 5 illustrates an apparatus according to an embodiment, wherein the apparatus comprises a signal generator 130 being configured to generate an audio output signal depending on the assigning of the plurality of time-frequency bins to the two or more signal component groups.

For example, signal generator may filter the different components of the audio signal by applying different weighting factors on the magnitude values of the time-frequency bins of the different signal component groups. For example, the harmonic signal component group may have a first weighting factor $w_h$, the percussive signal component group may have a second weighting factor $w_p$, and the residual signal component group may have a first weighting factor $w_r$, and the magnitude value of each time-frequency bin of the plurality of time-frequency bins may, e.g., be weighted with the weighting factor of the signal component group, the time-frequency bin is assigned to.

For example, to emphasize harmonic signal components, in an embodiment, where the weighting factors are multiplied the with linear magnitude values e.g., $w_h=1.3, w_p=0.7$, and $w_r=0.2$ For example, to emphasize harmonic signal components, in an embodiment, where the weighting factors are added to the logarithmic magnitude values e.g., $w_h=+0.26, w_p=-0.35$, and $w_r=-1.61$ For example, to emphasize percussive signal components, in an embodiment, where the weighting factors are multiplied the with linear magnitude values e.g., $w_h=0.7, w_p=1.3$, and $w_r=0.2$ For example, to emphasize percussive signal components, in an embodiment, where the weighting factors are added to the logarithmic magnitude values e.g., $w_h=-0.35, w_p=+0.26$, and $w_r=-1.61$ Thus, the signal generator 130 is configured to apply a weighting factor on the magnitude value of each time-frequency bin of the plurality of time-frequency bins to obtain the audio output signal, wherein the weighting factor that is applied on said time-frequency bin depends on the signal component group to which said time-frequency bin is assigned.

In a particular embodiment of FIG. 5, the signal processor 130 may, e.g., be an upmixer being configured to upmix the audio signal to obtain the audio output signal comprising two or more audio output channels. The upmixer may, e.g., be configured to generate the two or more audio output channels depending on the assigning of the plurality of time-frequency bins to the two or more signal component groups.

For example, the two or more audio output channels may be generated from the audio signal filter the different components of the audio signal by applying different weighting factors on the magnitude values time-frequency bins of the different signal component groups as described above.

However, to generate the different audio channels different weights for the signal component groups may be used that may, e.g., be specific for each of the different audio output channels.

For example, for a first audio output channel, the weights to be added to the logarithmic magnitude values may, e.g., be $w_{1h}=+0.26$, $w_{1p}=-0.35$, and $w_{1r}=-1.61$.

And for a second audio output channel, the weights to be added to the logarithmic magnitude values may, e.g., be $w_{2h}=+0.35$, $w_{2p}=-0.26$, and $w_{2r}=-1.61$.

For example, when upmixing the audio signal to obtain five audio output channels front left, center, right, left surround and right surround:

The harmonic weighting factor $w_{1h}$ may be greater for generating the left, center and right audio output channels compared to the harmonic weighting factor $w_{2h}$ for generating the left surround and right surround audio output channels.

The percussive weighting factor $w_{1p}$ may be smaller for generating the left, center and right audio output channels compared to the percussive weighting factor $w_{2p}$ for generating the left surround and right surround audio output channels.

Individual weighting factors may be used for each audio output channel to be generated.

Figure 6:
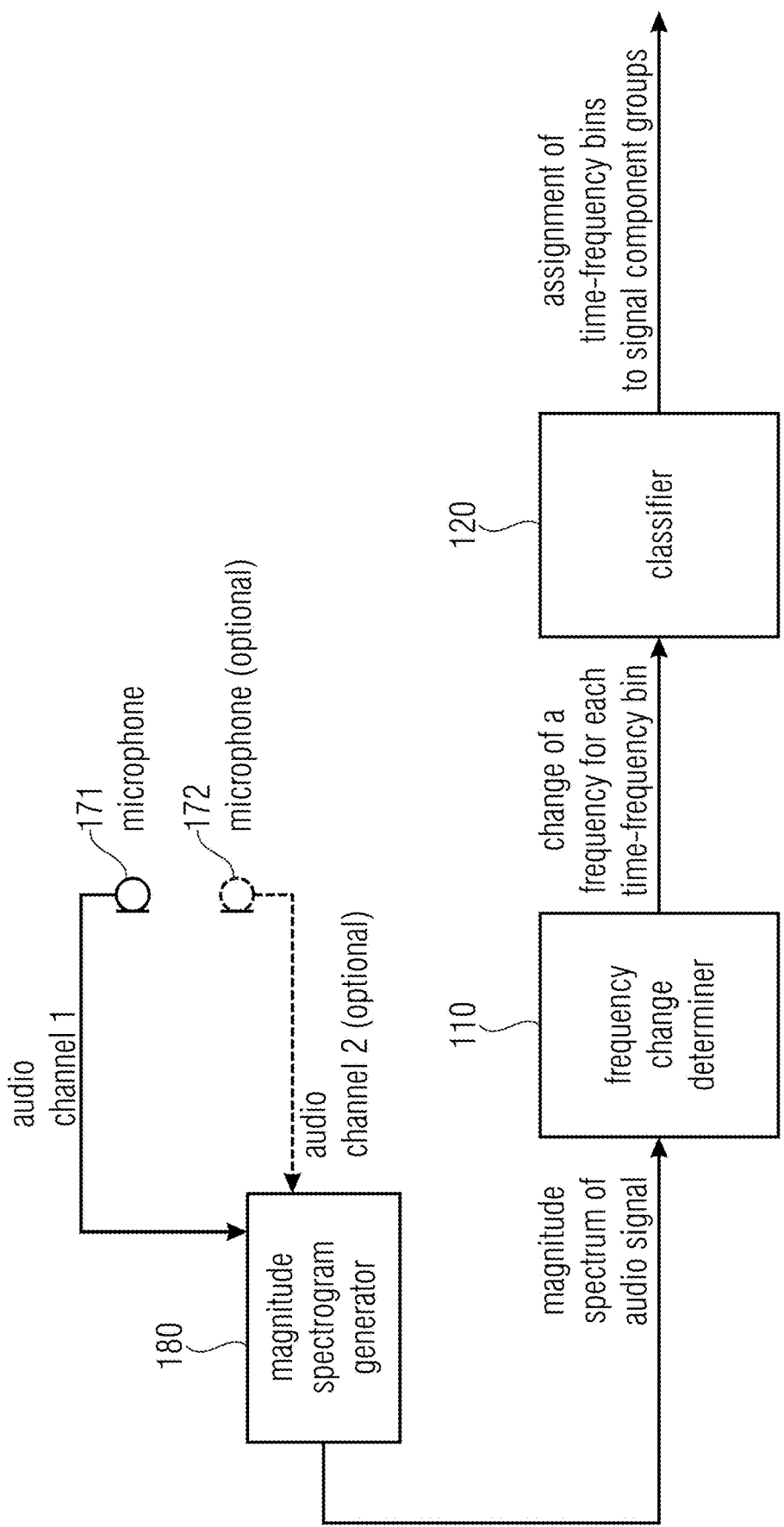
FIG. 6 illustrates an apparatus according to an embodiment, wherein the apparatus comprises one or more microphones for recording the audio signal.

FIG. 6 illustrates an apparatus according to an embodiment, wherein the apparatus comprises one or more microphones 171, 172 for recording the audio signal.

In FIG. 6, the first microphone 171 records a first audio channel of the audio signal. The optional second microphone 172 records an optional second audio channel of the audio signal.

Moreover, the apparatus of FIG. 6 further comprises a magnitude spectrogram generator 180 for generating the magnitude spectrogram of the audio signal from the audio signal which comprises the first audio channel and optionally comprises the optional second audio channel. Generating a magnitude spectrogram from an audio signal is a well-known concept for a person skilled in the an.

In the following, evaluation of embodiments is considered.

To show the effectiveness of embodiments in capturing frequency modulated sounds in the harmonic component, the HPR method based on the structure tensor (HPR-ST) according to embodiments is compared with the non-iterative method based on median filtering presented in [10] (HPR-M). Additionally, the metrics are also computed for the separation results with ideal binary masks (IBM) that served as a reference for the maximal achievable separation quality.

Considering a system-under-test parameters, for both HPR-ST as well as HPR-M, the STFT parameters were chosen to be $f_s=22050$ Hz, N=1024 and H=256, using a sine window for w. The separation parameters for HPR-M were chosen as in the experiments performed in [10]. According to embodiments, the structure tensor is calculated using a differential operator, for example, the Scharr-Operator [17] as discrete differentiation operator d. The smoothing was performed using a 9×9 isotropic Gaussian filter with the standard deviations $\sigma_b=\sigma_k=1.4$ which leads to $\sigma_t\approx16$ ms and $\sigma_f\approx30$ Hz. Finally, the thresholds for the separation were set to e=20, c=0.2 and $r_h=r_p=10000$ Hz/s.

It should be noted that by the choice of $r_h$ and $r_p$ according to embodiments, even very steep structures in the spectrogram are assigned to the harmonic component. Embodiments employ the observations about real world vibrato sounds as for example shown in FIG. 2. Here, you can see that at some instances the vibrato in the singing voice has a very high instantaneous frequency change rate. Furthermore, it should be noted that by choosing $r_h=r_p$, an assignment of a bin in the spectrogram to the residual component is purely dependent on its anisotropy measure.

The effectiveness of HPR-ST according to embodiments was evaluated by comparing it to the state-of-art median filtering based method HPR-M presented in [10] by means of both objective evaluation measures as well as audio examples.

To compare the behavior of HPR-ST according to embodiments and HPR-M of the conventional technology when applied to signals containing frequency modulated sounds to obtain objective results, two test items were generated.

Test item 1 consists of the superposition of purely synthetic sounds. The harmonic source was chosen to be a vibrato tone with a fundamental frequency of 1000 Hz, a vibrato frequency of 3 Hz, vibrato extent of 50 Hz and 4 overtones. For the percussive source several impulses are used, while white noise represents the neither harmonic nor percussive residual source.

Test item 2 was generated by superimposing real world signals of singing voice with vibrato (harmonic), castanets (percussive), and applause (neither harmonic nor percussive).

Interpreting the HPR separation of these items as a source separation problem, standard source separation evaluation metrics have been computed (source to distortion ratio SDR, source to interference ratio SIR, and source to artifacts ratios SAR, as introduced in [18]) for the separation results of both procedures. The results are shown in table 1.

Table 1 depicts objective evaluation measures, where all values are given in dB.

TABLE 1

| | | SDR | | | SIR | | | SAR | | |
|---|---|---|---|---|---|---|---|---|---|---|
| | | IBM | HPR-M | HPR-ST | IBM | HPR-M | HPR-ST | IBM | HPR-M | HPR-ST |
| Item 1 | Vibrato | 29.43 | 11.51 | 21.25 | 34.26 | 27.94 | 30.01 | 31.16 | 11.61 | 21.88 |
| | Impulses | 8.56 | −10.33 | −1.47 | 20.31 | −7.96 | 12.03 | 8.90 | 2.02 | −1.00 |
| | Noise | 8.49 | −13.53 | 2.58 | 24.70 | −11.99 | 14.12 | 8.61 | 3.97 | 3.06 |
| Item 2 | Vocals | 14.82 | 6.48 | 9.18 | 22.75 | 20.83 | 15.61 | 15.60 | 6.68 | 10.42 |
| | Castanets | 8.48 | 3.79 | 2.37 | 21.59 | 16.09 | 17.96 | 8.73 | 4.16 | 2.56 |
| | Applause | 7.39 | −2.03 | −0.37 | 20.31 | 1.11 | 6.34 | 7.66 | 3.33 | 1.58 |

For item 1 HPR-ST yields a SDR of 21.25 dB for the vibrato tone, and is therefore closer to the optimal separation result of IBM (29.43 dB) than to the separation result of HPR-M (11.51 dB). This indicates that HPR-ST improves on capturing this frequency modulated sound in the harmonic component in comparison to HPRM. This is also shown in FIG. 4.

Figure 4:
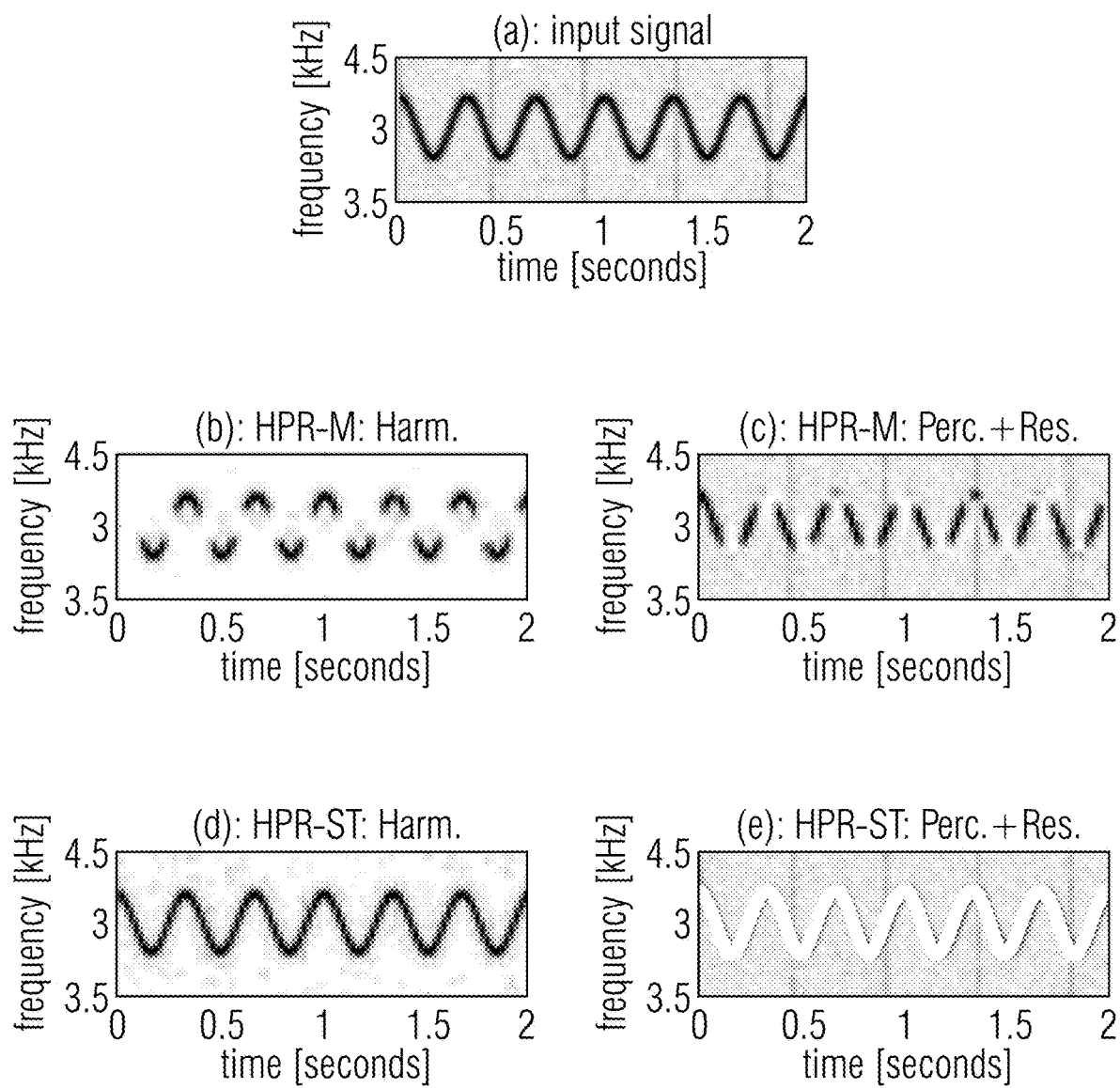
FIG. 4 illustrates a comparison between the HPR-M and HPR-ST method for an excerpt of a synthetic input signal.

FIG. 4 illustrates a comparison between the HPR-M and HPR-ST method for an excerpt of the synthetic input signal (item 1). For enhanced visibility the spectrograms were calculated with different STFT parameters than used for the separation algorithms.

FIG. 4 (a) illustrates the frequency of the input signal with respect to time. In FIG. 4, the spectrograms of the harmonic components and the sum of the percussive and residual component computed for both procedures are plotted. It can be seen that for HPR-M the steep slopes of the vibrato tone leaked into the residual component (FIGS. 4 (b) and (c)), while HPR-ST (FIGS. 4 (d) and (e)) yields a good separation. This also explains the very low SIR values of HPRM for the residual component compared to HPR-ST (−11.99 dB vs. 14.12 dB).

It should be noted that the high SIR value of HPR-M for the harmonic component only reflects that there are little interfering sounds from the other components, not that the sound of the vibrato is well captured as a whole. In general most of the observations for item 1 are less pronounced, but also valid for the mixture of real world sounds in item 2. For this item, the SIR value of HPR-M for the vocals even exceeds the SIR value of HPR-ST (20.83 dB vs. 15.61 dB). Again, the low SIR value for the applause supports that portions of the vibrato in the vocals leaked into the residual component for HPR-M (1.11 dB) while the residual component of HPR-ST contains less interfering sounds (6.34 dB). This indicates that embodiments were capable of capturing the frequency modulated structures of the vocals much better than NPR-M.

Summarizing the results, for signals that contain frequency modulated tones, the HPR-ST concept of embodiments provides much better separation results compared to HPR-M.

Some embodiments employ the structure tensor for singing voice detection. (Singing voice detection according to the conventional technology is described in [2]).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Aggelos Gkiokas, Vassilios Katsouros, George Carayannis, and Themos Stafylakis, "*Music tempo estimation and* beat tracking by applying source separation and metrical relations", in Proceedings of the IEEE International Conference on Acoustics, Speech, and Signal Processing (ICASSP), 2012, pp. 421-424.

[2] Bernhard Lehner, Gerhard Widmer, and Reinhard Sonnleitner, "On the reduction of false positives in singing voice detection", in Proceedings of the IEEE International Conference on Acoustics, Speech, and Signal Processing (ICASSP), Florence, Italy, 2014, pp. 7480-7484,

[3] Yoshi Ueda, Yuuki Uchiyama, Takuya Nishimoto, Nobutaka Ono, and Shigeki Sagayama, "HMM-based approach for automatic chord detection using refined acoustic features", in Proceedings of the IEEE International Conference on Acoustics, Speech, and Signal Processing (ICASSP), Dallas, Tex., USA, 2010, pp. 5518-5521.

[4] Nobutaka Ono, Kenichi Miyamoto, Hirokazu Kameoka, and Shigeki Sagayama, "A real-time equalizer of harmonic and percussive components in music signals", in Proceedings of the International Society for Music Information Retrieval Conference (ISMIR), Philadelphia, Pa., USA, 2008, pp. 139-144,

[5] Nobutaka Ono, Kenichi Miyamoto, Jonathan LeRoux, Hirokazu Kameoka, and Shigeki Sagayama, "Separation of a monaural audio signal into harmonic/percussive components by complementary diffusion on spectrogram", in European Signal Processing Conference, Lausanne, Switzerland, 2008, pp. 240-244.

[6] Deny Fitzgerald, "Harmonic/percussive separation using median filtering", in Proceedings of the International Conference on Digital Audio Effects (DAFX), Graz, Austria, 2010, pp. 246-253,

[7] Scott N. Levine and Julius O. Smith III, "A sines+transients+noise audio representation for data compression and lime/pitch scale modications", in Proceedings of the AES Convention, 1998.

[8] Tony S. Verma and Teresa H. Y. Meng, "An analysis/synthesis tool for transient signals that allows a flexible sines+transients+noise model for audio", in Proceedings of the IEEE International Conference on Acoustics, Speech, and Signal Processing (ICASSP), Seattle, Wash., USA, May 1998, pp. 3573-3576.

[9] Laurent Daudet, "Sparse and structured decompositions of signals with the molecular matching pursuit", IEEE Transactions on Audio, Speech, and Language Processing, vol. 14, no. 5, pp. 1808-1816, September 2006.

[10] Jonathan Driedger, Meinard Mier, and Sascha Disch, "Extending harmonic-percussive separation of audio signals", in Proceedings of the International Conference on Music Information Retrieval (ISMIR), Taipei, Taiwan, 2014, pp. 611-616.

[11] Jeongsoo Park and Kyogu Lee, "Harmonic-percussive source separation using harmonicity and sparsity constraints", in Proceedings of the International Conference on Music Information Retrieval (ISMIR), Málaga, Spain, 2015, pp. 148-154.

[12] Josef Bigun and Gösta H. Granlund, "Optimal orientation detection of linear symmetry", in Proceedings of the IEEE First International Conference on Computer Vision, London, U K, 1987, pp. 433-438.

[13] Hans Knutsson, "Representing local structure using tensors", in 6th Scandinavian Conference on Image Analysis, Oulu, Finland, 1989, pp, 244-251.

[14] Chris Harris and Mike Stephens, "A combined corner and edge detector", in Proceedings of the 4th Alvey Vision Conference, Manchester, U K, 1988, pp. 147-151.

[15] Rolf Bardeli, "Similarity search in animal sound databases", IEEE Transactions on Multimedia, vol. 11, no. 1, pp. 68-76, January 2009.

[16] Matthias Zeppelzauer, Angela S. Stöger, and Christian Breiteneder, "Acoustic detection of elephant presence in noisy environments", in Proceedings of the 2nd ACM International Workshop on Multimedia Analysis for Ecological Data, Barcelona, Spain, 2013, pp 4. 3-8.

[17] Hanna Scharr, "Optimale Operetoren in der digitaien Bildverarbeitung", Dissertation, IWR, Fakultät für Physik and Astronomic, Universität Heidelberg, Heidelberg, Germany, 2000.

[18] Emmanuel Vincent, Remi Gribonval, and Cédric Févotte, "Performance measurement in blind audio source separation", IEEE Transactions on Audio, Speech, and Language Processing, vol. 14, no. 4, pp. 1462-1469, 2006.

The invention claimed is:

1. An apparatus for analysing a magnitude spectrogram of an audio signal, comprising:
a frequency change determiner being configured to determine a change of a frequency for each time-frequency bin of a plurality of time-frequency bins of the magnitude spectrogram of the audio signal depending on the magnitude spectrogram of the audio signal, and
a classifier being configured to assign each time-frequency bin of the plurality of time-frequency bins to a signal component group of two or more signal component groups depending on the change of the frequency determined for said time-frequency bin.

2. The apparatus according to claim 1,
wherein the frequency change determiner is configured to determine the change of the frequency for each time-frequency bin of the plurality of time-frequency bins depending on an angle for said time-frequency bin, wherein the angle for said time-frequency bin depends on the magnitude spectrogram of the audio signal.

3. The apparatus according to claim 2,
wherein the frequency change determiner is configured to determine the change of the frequency for each time-frequency bin of the plurality of time-frequency bins further depending on a sampling frequency of the audio signal, and depending on a length of an analysis window and depending on a hop size of the analysis window.

4. The apparatus according to claim 3,
wherein the apparatus frequency change determiner is configured to determine the change of the frequency for each time-frequency bin of the plurality of time-frequency bins depending on the formula $$R(b, k) = \frac{f_s^2}{HN} \cdot \tan(\alpha(b, k))$$

wherein (b, k) indicates a time-frequency bin of the plurality of time-frequency bins,
wherein R(b, k) indicates the change of the frequency for said time-frequency bin,
wherein b indicates time,
wherein k indicates frequency,
wherein $f_s$ indicates the sampling frequency of the audio signal,
wherein N indicates the length of the analysis window,
wherein H indicates the hop size of the analysis window, and wherein α(b, k) indicates the angle for said time-frequency bin, wherein the angle α(b, k) depends on the magnitude spectrogram.

5. The apparatus according to claim 2,
wherein the frequency change determiner is configured to determine a partial derivative of the magnitude spectrogram of the audio signal with respect to a time index,
wherein the frequency change determiner is configured to determine a partial derivative of the magnitude spectrogram of the audio signal with respect to a time index, and
wherein the frequency change determiner is configured to determine a structure tensor for each time-frequency bin of the plurality of time-frequency bins depending on the partial derivative of the magnitude spectrogram of the audio signal with respect to the time index and depending on the partial derivative of the magnitude spectrogram of the audio signal with respect to the frequency index, and
wherein the frequency change determiner is configured to determine the angle for each time-frequency bin of the plurality of time-frequency bins depending the structure tensor for said time-frequency bin.

6. The apparatus according to claim 5,
wherein the frequency change determiner is configured to determine the angle for each time-frequency bin of the plurality of time-frequency bins by determining two components of $v_1(b, k)$ and $v_2(b, k)$ an eigenvector $v(b, k)$ of the structure tensor of said time-frequency bin, and by determining the angle for said time-frequency bin according to $$\alpha(b, k) = \operatorname{atan}\left(\frac{v_2(b, k)}{v_1(b, k)}\right) \in [-\pi/2; \pi/2]$$

wherein α(b, k) indicates the angle for said time-frequency bin,
wherein b indicates time,
wherein k indicates frequency, and
wherein atan( ) indicates an inverse tangent function.

7. The apparatus according to claim 5,
wherein the classifier is configured to determine a measure of anisotropy for each time-frequency bin of the plurality of time-frequency bins depending on at least one of the formulae:

$$\left(\frac{\mu(b, k) - \lambda(b, k)}{\mu(b, k) + \lambda(b, k)}\right)^2$$

and $$\mu(b, k) + \lambda(b, k) \geq e,$$

wherein μ(b, k) is a first eigenvalue λ(b, k) is a second eigenvalue of the structure tensor of said time-frequency bin, and $e \in \mathbb{R} > 0$,
wherein the classifier is configured to assign each time-frequency bin of the plurality of time-frequency bins to a signal component group of two or more signal component groups further depending on the change of the measure of anisotropy.

8. The apparatus according to claim 7,
wherein the classifier is configured to determine the measure of anisotropy for said time-frequency bin depending on the formula:

$$C(b, k) = \begin{cases} \left(\frac{\mu(b, k) - \lambda(b, k)}{\mu(b, k) + \lambda(b, k)}\right)^2, & \mu(b, k) + \lambda(b, k) \geq e \\ 0, & \text{else} \end{cases}$$

wherein C(b, k) is the measure of anisotropy depending for said time-frequency bin, and
wherein the classifier is configured to assign said time-frequency bin to a residual component group of the two or more signal component groups, if the measure of anisotropy C(b, k) is smaller than a first threshold value c, or wherein the classifier is configured to assign said time-frequency bin to the residual component group of the two or more signal component groups, if the measure of anisotropy C(b, k) is smaller than or equal to the first threshold value c,
wherein $c \in \mathbb{R} > 0$.

9. The apparatus according to claim 1, wherein the classifier is configured to assign each time-frequency bin of the plurality of time-frequency bins to a signal component group of two or more signal component groups depending on the change of the frequency determined for said time-frequency bin, so that the classifier assigns a time-frequency bin of the plurality of time-frequency bins to a harmonic signal component group of the two or more signal component groups depending on whether an absolute value of the change of the frequency determined for said time-frequency bin is smaller than a second threshold value $r_h$, or depending on whether the absolute value of the change of the frequency determined for said time-frequency bin is smaller than or equal to the second threshold value $r_h$,
wherein $r_h \in \mathbb{R} > 0$.

10. The apparatus according to claim 1, wherein the classifier is configured to assign each time-frequency bin of the plurality of time-frequency bins to a signal component group of two or more signal component groups depending on the change of the frequency determined for said time-frequency bin, so that the classifier assigns a time-frequency bin of the plurality of time-frequency bins to a percussive signal component group of the two or more signal component groups depending on whether an absolute value of the change of the frequency determined for said time-frequency bin is greater than a third threshold value $r_p$, or depending on whether the absolute value of the change of the frequency determined for said time-frequency bin is greater than or equal to the third threshold value $r_p$,
wherein $r_p \in \mathbb{R} > 0$.

11. The apparatus according to claim 9, wherein the classifier is configured to assign each time-frequency bin of the plurality of time-frequency bins to a signal component group of two or more signal component groups depending on the change of the frequency determined for said time-frequency bin, so that the classifier assigns a time-frequency bin of the plurality of time-frequency bins to a percussive signal component group of the two or more signal component groups depending on whether the absolute value of the change of the frequency determined for said time-frequency bin is greater than a third threshold value $r_p$, or depending on whether the absolute value of the change of the frequency determined for said time-frequency bin is greater than or equal to the third threshold value $r_p$,
wherein $r_p \in \mathbb{R} > 0$.

12. The apparatus according to claim 1, wherein the apparatus comprises a signal generator being configured to generate an audio output signal depending on the assigning of the plurality of time-frequency bins to the two or more signal component groups.

13. The apparatus according to claim 12, wherein the signal generator is configured to apply a weighting factor on the magnitude value of each time-frequency bin of the plurality of time-frequency bins to acquire the audio output signal, wherein the weighting factor that is applied on said time-frequency bin depends on the signal component group to which said time-frequency bin is assigned.

14. The apparatus according to claim 12,
wherein the signal processor is an upmixer being configured to upmix the audio signal to acquire the audio output signal comprising two or more audio output channels,
wherein the upmixer is configured to generate the two or more audio output channels depending on the assigning of the plurality of time-frequency bins to the two or more signal component groups.

15. The apparatus according to claim 1,
wherein the apparatus comprises one or more microphones for recording the audio signal, and
wherein the apparatus further comprises a magnitude spectrogram generator for generating the magnitude spectrogram of the audio signal from the audio signal.

16. A method for analysing a magnitude spectrogram of an audio signal, comprising:

determining a change of a frequency for each time-frequency bin of a plurality of time-frequency bins of the magnitude spectrogram of the audio signal depending on the magnitude spectrogram of the audio signal, and assigning each time-frequency bin of the plurality of time-frequency bins to a signal component group of two or more signal component groups depending on the change of the frequency determined for said time-frequency bin.

17. A non-transitory digital storage medium having a computer program stored thereon to perform the method for analysing a magnitude spectrogram of an audio signal, comprising:

determining a change of a frequency for each time-frequency bin of a plurality of time-frequency bins of the magnitude spectrogram of the audio signal depending on the magnitude spectrogram of the audio signal, and assigning each time-frequency bin of the plurality of time-frequency bins to a signal component group of two or more signal component groups depending on the change of the frequency determined for said time-frequency bin, when said computer program is run by a computer.

* * * * *